US012242933B1

(12) United States Patent
Sathe et al.

(10) Patent No.: US 12,242,933 B1
(45) Date of Patent: Mar. 4, 2025

(54) ADAPTIVE MODEL FOR VEHICLE PROCESSING OF IMAGES

(71) Applicant: Lytx, Inc., San Diego, CA (US)

(72) Inventors: Mihir Sathe, San Diego, CA (US); Jesse Daniels, San Diego, CA (US)

(73) Assignee: Lytx, Inc., San Diego, CA (US)

(*) Notice: Subject to any disclaimer, the term of this patent is extended or adjusted under 35 U.S.C. 154(b) by 853 days.

(21) Appl. No.: 17/466,156

(22) Filed: Sep. 3, 2021

(51) Int. Cl.
*G06N 20/00* (2019.01)

(52) U.S. Cl.
CPC .................................. *G06N 20/00* (2019.01)

(58) Field of Classification Search
CPC .................................................... G06N 20/00
USPC ............................................................ 706/12
See application file for complete search history.

(56) References Cited

U.S. PATENT DOCUMENTS

| | | | | |
|---|---|---|---|---|
| 3,804,176 A * | 4/1974 | Harrell | ................... | A01D 29/00 171/101 |
| 4,436,484 A * | 3/1984 | Temple | ................. | F04D 29/283 416/214 R |
| 10,885,360 B1 * | 1/2021 | Daniels | .................. | G06V 20/56 |
| 11,010,640 B1 * | 5/2021 | Daniels | .................. | G06V 10/454 |
| D959,120 S * | 8/2022 | Daniels | ........................... | D2/951 |
| D959,121 S * | 8/2022 | Daniels | ........................... | D2/951 |
| 11,449,777 B1 * | 9/2022 | Sathe | .................. | G06F 9/45558 |
| D972,264 S * | 12/2022 | Daniels | ........................... | D2/951 |
| D972,273 S * | 12/2022 | Daniels | ........................... | D2/951 |
| 11,550,713 B1 * | 1/2023 | Piwonka | ................ | G06F 3/0652 |
| 11,590,982 B1 * | 2/2023 | Daniels | ................. | B60W 40/09 |
| 11,615,654 B1 * | 3/2023 | Krotosky | .............. | G07C 5/0866 701/31.4 |
| 11,775,640 B1 * | 10/2023 | Sathe | ................... | H04L 63/1416 726/24 |
| 11,863,613 B1 * | 1/2024 | Sathe | ................... | H04L 67/1008 |
| 11,886,782 B2 * | 1/2024 | Manek | ..................... | G06N 3/09 |
| 2007/0145819 A1 * | 6/2007 | Lin | ..................... | B60T 8/17552 303/146 |
| 2007/0213911 A1 * | 9/2007 | Trombley | ................. | B60T 8/17 701/70 |
| 2017/0261599 A1 * | 9/2017 | Zeng | ....................... | G01S 13/08 |
| 2018/0032510 A1 * | 2/2018 | Sathe | ...................... | G06F 40/58 |
| 2019/0379589 A1 * | 12/2019 | Ryan | ..................... | G06F 17/142 |
| 2020/0050196 A1 * | 2/2020 | Liao-McPherson | ......................... | G05B 13/048 |
| 2020/0372410 A1 * | 11/2020 | Karaletsos | ............ | G06N 20/00 |
| 2020/0387797 A1 * | 12/2020 | Ryan | ..................... | G06N 3/084 |
| 2021/0117705 A1 * | 4/2021 | Liu | ........................ | G06N 3/08 |
| 2021/0200826 A1 * | 7/2021 | Schuler | .................. | G06F 16/43 |
| 2021/0213977 A1 * | 7/2021 | Aragon | .................. | G06N 3/084 |
| 2021/0357998 A1 * | 11/2021 | Daniels | ............. | G06Q 30/0601 |
| 2021/0387584 A1 * | 12/2021 | Daniels | .................. | G06V 20/58 |

(Continued)

*Primary Examiner* — Reza Nabi
(74) *Attorney, Agent, or Firm* — Van Pelt, Yi & James LLP

(57) ABSTRACT

A system for training a model comprises an interface and a processor. The interface is configured to receive a general training set and a set of specific data sets. The processor is configured to train a back end model using the general training set; combine the back end model with a first front end model to create a general combined model; train the general combined model with the set of specific data sets; freeze back end weights of the back end model in the general combined model and combine the back end model with a first specific front end model to create a first specific model; train the first specific model with a first specific data set of the set of specific data sets; and provide the first specific model.

18 Claims, 10 Drawing Sheets

(56) References Cited

U.S. PATENT DOCUMENTS

| | | | |
|---|---|---|---|
| 2022/0261590 A1* | 8/2022 | Brahma | G06V 20/56 |
| 2022/0261658 A1* | 8/2022 | Souly | G06N 3/045 |
| 2022/0299626 A1* | 9/2022 | Chen | G01S 7/412 |
| 2023/0169396 A1* | 6/2023 | Maccanti | G06N 20/00 |
| | | | 706/10 |
| 2023/0171164 A1* | 6/2023 | Maccanti | H04L 67/02 |
| | | | 709/224 |
| 2023/0186490 A1* | 6/2023 | Takimoto | G06T 7/248 |
| | | | 382/107 |
| 2023/0280183 A1* | 9/2023 | Hayat | G01C 21/3841 |
| | | | 701/423 |
| 2023/0289281 A1* | 9/2023 | Redford | G06F 30/27 |
| 2024/0338947 A1* | 10/2024 | Sarvadevabhatla | G06V 10/25 |

* cited by examiner

ADAPTIVE MODEL FOR VEHICLE PROCESSING OF IMAGES

BACKGROUND OF THE INVENTION

A monitoring system collects data and uses the data to monitor its environment. Data is collected using a data collection system including one or more sensors. For example, a monitoring system comprises a vehicle event recorder mounted on a vehicle. The monitoring system analyzes the collected data set to determine specific features in the collected data (set) and provides output based on incident captured by the vehicle event recorder and data collected in the data collection system. To determine these specific features, a model is typically trained to recognize the features. However, accurately recognizing the features in diverse scenarios is difficult for a single model. Another approach is to train a different model for each type of scenario. However, this leads to multiple models each with their own training requirements. This poses a problem for accurately determining the specific features and efficiently training one or more models to perform this determination.

BRIEF DESCRIPTION OF THE DRAWINGS

Various embodiments of the invention are disclosed in the following detailed description and the accompanying drawings.

DETAILED DESCRIPTION

Figure 1:
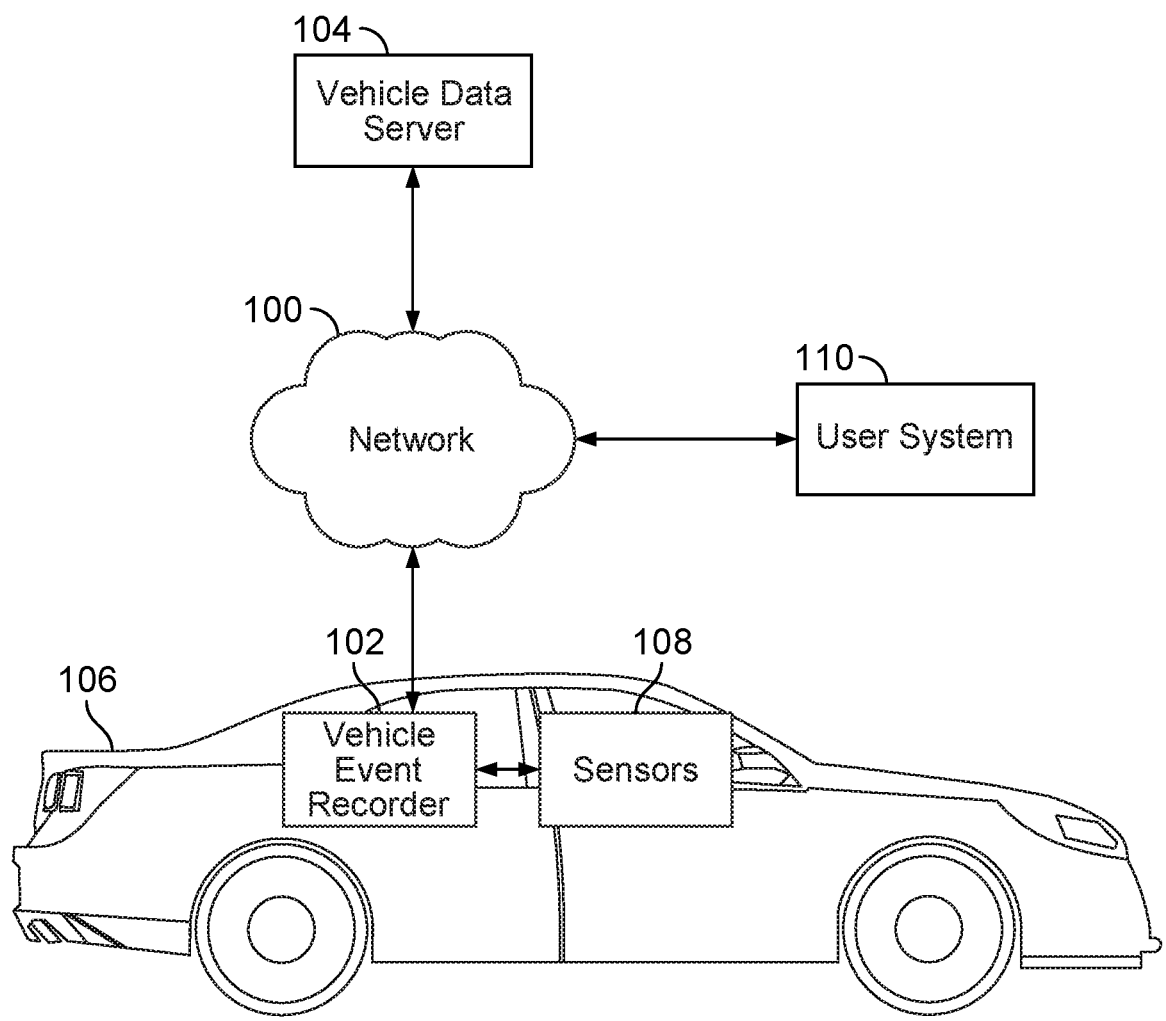
FIG. 1 is a block diagram illustrating an embodiment of a system including a vehicle event recorder.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for detecting specific features within a captured incident comprises an interface configured to receive a general training set and a set of specific data set. The system for detecting specific features additionally comprises a processor configured to train a back end model using a general training set, and combine the back end model with a first front end model to create a general combined model, and then train the general combined model with a set of specific data sets. The processor is further configured to freeze back end weights of the back end model in the general combined model and combine the back end model with a first specific front end model to create a first specific model. Furthermore, the processor is configured to train the first specific model with a first specific data set of the set of specific data sets and provide the first specific model. The system for detecting specific features additionally comprises a memory coupled to the processor and configured to provide the processor with instructions.

The system for an adaptive model for vehicle processing of images detects specific features in an incident captured (e.g., an image, a video clip, etc.) by a vehicle event recorder (e.g., using vehicle recorder sensors—for example, a camera, an accelerometer, a global positioning sensor (GPS), etc.) mounted on a moving vehicle. The system creates a trained specialized model (e.g., on a server) and employs the model on the vehicle to detect the features. The system improves training and efficiency by breaking the model into two parts: a back end model and a front end model. The back end model can be combined with multiple front end models to create multiple specialized models. However, training is made more efficient by first training the back end model on a common training set (e.g., a baseline dataset—for example, ImageNet). The back end weights of the back end model are frozen and then the back end model is combined with a front model to create a combined model. The combined model is then trained on a set of specific data sets to create a general model. The back end of the general model is then frozen, and the general model front end is then trained using a specific data set of the set of specific data sets to create a specialized model. For example, a specialized model is created for recognizing lanes in a city and another specialized model is created for recognizing lanes on a highway, where the general model is trained on all lane types and the specialized models are finalized by training on a specific data set related to the special context (e.g., the city lanes or highway lanes). Similarly, a specialized model can be created to recognize following too close to another vehicle for a heavy truck and another specialized model can be created to recognize following too close to another vehicle for a lighter van, where again the general model is trained on all following and the specialized models are finalized by training on a specific data set related to the special context (e.g., the heavy truck following data and the lighter van following data). In various embodiments, multiple specialized models are created for one or more location types, weather condition types, vehicle types, traffic level types, speed level types, signage types, countries, states, or counties.

Accordingly, first, an image or an input data set along with one or more context categories are captured by a sensor, wherein, a context category includes one or more of the following: location, a weather condition, a vehicle type, a traffic level, a speed level, a signage type, a country name, a state name, or a county name. Thereafter, the processor determines (1) if the input data set is associated with a context category associated with a specialized model, (2) then processes the input data set using the specialized model and providing output of the specialized model. The processor can process the input data set using multiple appropriate specialized models for whichever context categories are matched by the input data and its associated context categories.

Alternatively, an untrained back end model is trained using a general training set and then the back end weights are frozen. Subsequently, the back end model is combined with a front end model to create an combined model, wherein the combined model is trained first using a combined specialized training set and then multiple copies of this trained combined model are each separately trained with a specific training data set to create a specific specialized model. For example, a combined model is first trained using a combined lane identification data set. Then, the trained combined model is copied to create multiple versions. One version is subsequently trained with a specific lane identification data set to create a trained specific combined model. For example, the combined lane identification data set can include all different types of lanes—for example, lanes with cross-walks, intersections, and lanes that can be found either in a city, mountain, or highway, etc. In some embodiments, a specific lane identification data set might be a data set that includes only city lane identification data, only highway lane identification data, or only mountain lane identification data. These specific models can later be selected and used based on the context categories associated with the input data. In various embodiments, the specific data sets for specific models comprise one or more of the following: a rain weather following distance data set, a sunny weather following distance data set, a snow weather following distance data set, a windy weather following distance data set, and/or any other appropriate data set. In various embodiments, the specific data sets for specific models comprise one or more of the following: a car vehicle type following distance data set, a trailer truck vehicle type following distance data set, a van vehicle type following distance data set, a bus following distance data set, and/or any other appropriate data set. In various embodiments, the specific data sets for specific models comprise one or more of the following: a sparse traffic type following distance data set, a medium level traffic type following distance data set, a dense traffic type following distance data set, and/or any other appropriate data set. In various embodiments, the specific data sets for specific models comprise one or more of the following: a car vehicle type driver face ID data set, a trailer truck vehicle type driver face ID data set, a van vehicle type driver face ID data set, a bus driver face ID data set, and/or any other appropriate data set. In various embodiments, the specific data sets for specific models comprise one or more of the following: a specific country road sign data set, a specific city road sign data set, a specific region road sign data set (e.g., where a region comprises a county), and/or any other appropriate data set. In various embodiments, the specific data sets for specific models comprise one or more of the following: a uniform wearing seat belt detection data set and/or a general clothing seat belt detection data set. In some embodiments, a uniform camouflages the seat belt. In various embodiments, the specific data sets for specific models comprise a near object detection data set and/or a far object detection data set.

In some embodiments, the first specific front end model is initialized to a final weight state of the first front end model within the general combined model after training. In some embodiments, the first specific front end model is initialized to a generic starting state. In some embodiments, the first specific model is one of a set of specific models where each specific model corresponds to a specific data set of the set of specific data sets. In some embodiments, the processor is further configured to train a second specific model with a second specific data set of the set of specific data sets.

In some embodiments, the trained model with frozen weights is stored to be used for (multiple) subsequent specific data set training(s) to make training more efficient for each of the subsequent trainings. In some embodiments, other stages of trained models are stored to be used for (multiple) subsequent specific data set training(s) to make training more efficient for each of the subsequent trainings.

The system improves the computer by breaking models into two parts and making a number of specialized models that are trained for specific contexts. This improves the efficiency of the models as well as the training of the models. In some embodiments, a portion of the model is trained using a more generalized training set (e.g., the back end model), and a portion of the model is trained using a specific training set (e.g., a front end). The common training the back end model enables efficiency in training as this model is used as the back end (with weights already trained) in conjunction with a front end to complete training using a specialized data set. The resultant specialized model is also more accurate for recognizing features for the sensor data taken with matching contexts. Therefore, the present invention has benefits such as delivering accurate detection of specific features in the captured incident, decreasing the training load on the system, thereby increasing its efficiency. Also, it can further save time in training the back end and front ends.

FIG. 1 is a block diagram illustrating an embodiment of a system including a vehicle event recorder. In the example shown, vehicle event recorder 102 is mounted in a vehicle (e.g., a car, a truck, a trailer associated with a semi-truck, a van, a bus, a commercial vehicle, etc.). Vehicle event recorder 102 is in communication with sensors 108. Sensors 108 comprises a set of sensors—for example, one or more video recorders, audio recorders, accelerometers, gyroscopes, vehicle state sensors, proximity sensors, a global positioning system (GPS), outdoor temperature sensors, moisture sensors, laser line tracker sensors, etc. Vehicle state sensors comprise internal vehicle state sensors—for example, a speedometer, an accelerator pedal sensor, a brake pedal sensor, an engine revolutions per minute (RPM) sensor, an engine temperature sensor, a headlight sensor, an airbag deployment sensor, driver and passenger seat weight sensors, an anti-locking brake sensor, traction control system sensors, drive wheel speed sensors, shocks sensors, an engine exhaust sensor, a gear position sensor, a cabin equipment operation sensor, etc. Vehicle event recorder 102 comprises a system for receiving and processing sensor data. Processing sensor data comprises filtering data, normalizing the captured data, identifying patterns in data, detecting specific features in the data, etc. Vehicle event recorder 102 is mounted on vehicle 106 in any appropriate location—for example, the chassis, the front grill, the dashboard, the rear-view mirror, the rear window or wall, the floor, etc. There are times when vehicle event recorder 102 comprises multiple units mounted in different locations within vehicle 106 instead of a single unit, particularly when there are space constraints for a given location (e.g., there is limited space behind the rear view mirror) and more space is required to house electronic components. Vehicle event recorder 102 comprises a communications system for communicating with network 100. Network 100 comprises a network for communications. Network 100 comprises one or more of a wireless network, a wired network, a cellular network, a Code Division Multiple Access (CDMA) network, a Global System for Mobile Communication (GSM) network, a Long-Term Evolution (LTE) network, a Universal Mobile Telecommunications System (UMTS) network, a Worldwide Interoperability for Microwave Access (WiMAX) network, a Dedicated Short-Range Communications (DSRC) network, a local area network, a wide area network, the Internet, etc. There are instances when network 100 comprises multiple networks—for instance, multiple interconnected networks spanning different regions, networks operating at different times, overlaid networks with different access permissions, networks with different bandwidth, etc. Different networks comprising network 100 typically comprise different bandwidth cost (e.g., a wired network has a very low cost, a wireless Ethernet connection has a moderate cost, and/or a cellular data network has a high cost, etc.). In some embodiments, network 100 has a different cost at different times (e.g., a higher cost during the day and a lower cost at night).

Vehicle event recorder 102 communicates with vehicle data server 104 via network 100. Vehicle event recorder 102 stores, processes, and transmits data using an adaptive model. For example, an adaptive model indicates data collection parameters (e.g., sensors to collect data from, data bit rate, how often to collect data, etc.), adaptive model parameters (e.g., input data set, context categories, general training set, set of specific data sets), or any other appropriate parameters. Vehicle data server 104 receives data, processes data, stores data, requests more data, and provides stored data, etc. Vehicle data server 104 comprises a system for creating and training a specialized model. Vehicle data server 104 creates and trains a specialized model, and provides the model to vehicle event recorder 102 to detect specific features in a captured incident. Vehicle data server 104 comprises an interface configured to receive input data set (e.g., an image, a video clip, etc.) and a context category associated with an input data set (e.g., a location, a weather condition, a vehicle type, a traffic level, a speed level, a signage type, a country name, a state name, a county name, etc.). Vehicle data server 104 comprises a processor configured to create and train a specialized model. For example, the processor 1) trains a back end model using a general training set; 2) combines the back end model with a first front end model to create a general combined model; 3) trains the general combined model with a set of specific data sets; 4) freezes back end weights of the back end model in the general combined model and combines the back end model with a first specific front end model to create a first specific model; 5) train the first specific model with a first specific data set of the set of specific data sets; and 6) provide the first specific model.

Vehicle data server 104 provides the specialized model to vehicle event recorder 102. Vehicle event recorder 102 determines whether the input data set is associated with a context category associated with a specialized model, then processes the input data set using the specialized model to produce the output of the specialized model.

User system 110 communicates with vehicle data server 104 via network 100. User system 110 comprises a user system for use by a user. For example, user system 110 comprises a system for requesting data from vehicle data server 104, providing data to a user for viewing on the vehicle 106, receiving a request to create and train a specialized model, and receiving the output of the specialized model, etc.

Figure 2:
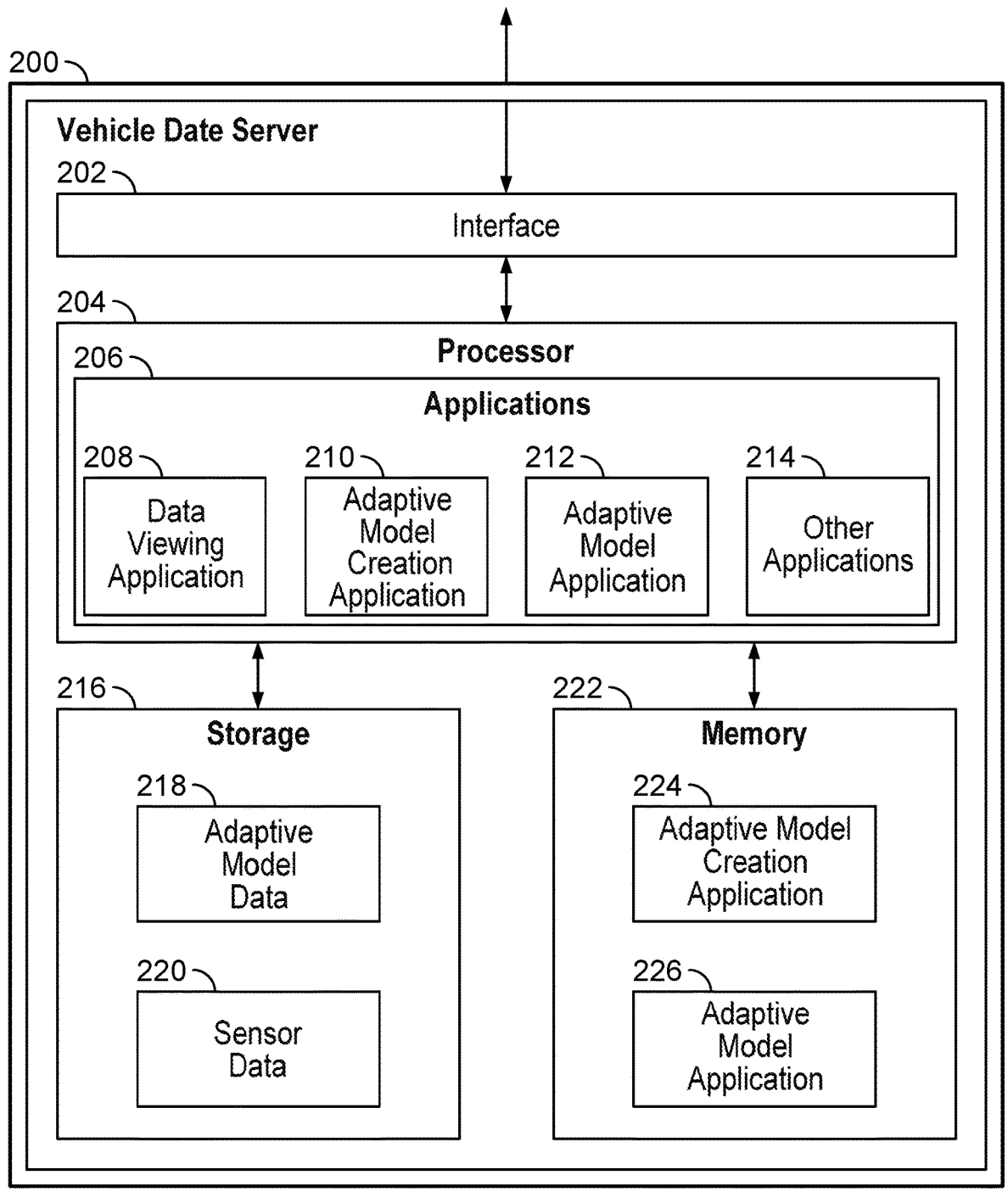
FIG. 2 is a block diagram illustrating an embodiment of a vehicle data server.

FIG. 2 is a block diagram illustrating an embodiment of a vehicle data server. In some embodiments, vehicle data server 200 comprises vehicle data server 104 of FIG. 1. In the example shown, vehicle data server 200 comprises interface 202. Interface 202 comprises an interface for communicating with external systems using a network. For example, interface 202 comprises an interface for communicating with a vehicle event recorder, an administrator system, a user system, etc. Processor 204 comprises a processor for executing applications 206. Applications 206 comprise data viewing application 208, adaptive model creation application 210, adaptive model application 212, and other applications 214. Data viewing application 208 comprises an application for providing data for viewing, for capturing viewing metadata, etc. Adaptive model creation application 210 trains the back end model using a general training set, specific training sets, and/or multiple specific training sets to create general models and specific models. Adaptive model creation application 210 combines the trained back end model with a front end model to create a combined model (e.g., to create general models and to create specific trained models). In various embodiments, adaptive model creation application 212 trains a back end model using a general training set, trains a general model using a general training set, trains a combined model using a set of specific training sets, trains a combined model using a a specific training set, or any other training or combination of trainings to create models. In some embodiments, adaptive model application 212 runs the model using input data from one or more vehicle event recorders. In some embodiments, adaptive model application 212 provides one or more models to a vehicle event recorders so that the vehicle event recorder can run the one or more models directly for data obtained from sensors associated with the vehicle event recorder or the vehicle associated with the vehicle event recorder.

Other applications 214 comprise any other appropriate applications (e.g., a communications application, a chat application, a web browser application, a document preparation application, a data storage and retrieval application, a user interface application, a data analysis application, etc.). Vehicle data server 200 additionally comprises storage 214. Storage 214 stores adaptive model data 218 and sensor data 220. Model data 218 comprises data for creating a model for detecting specific features in a captured incident (e.g. Lane detection, weather detection, level of traffic detection, etc.) and model data (e.g., general training set, specific data sets, etc.). Sensor data 220 comprises data collected by one or more sensors (e.g., sensors 108 of FIG. 1). For example, sensor data 220 comprises sensor data collected using a vehicle event recorder. Vehicle data server 200 additionally comprises memory 222. Memory 222 stores data during execution for adaptive model creation application 224 and adaptive model application 226. In various embodiments, memory 222 stores data during execution for a data viewing application or any other appropriate application executing using processor 206.

Figure 3:
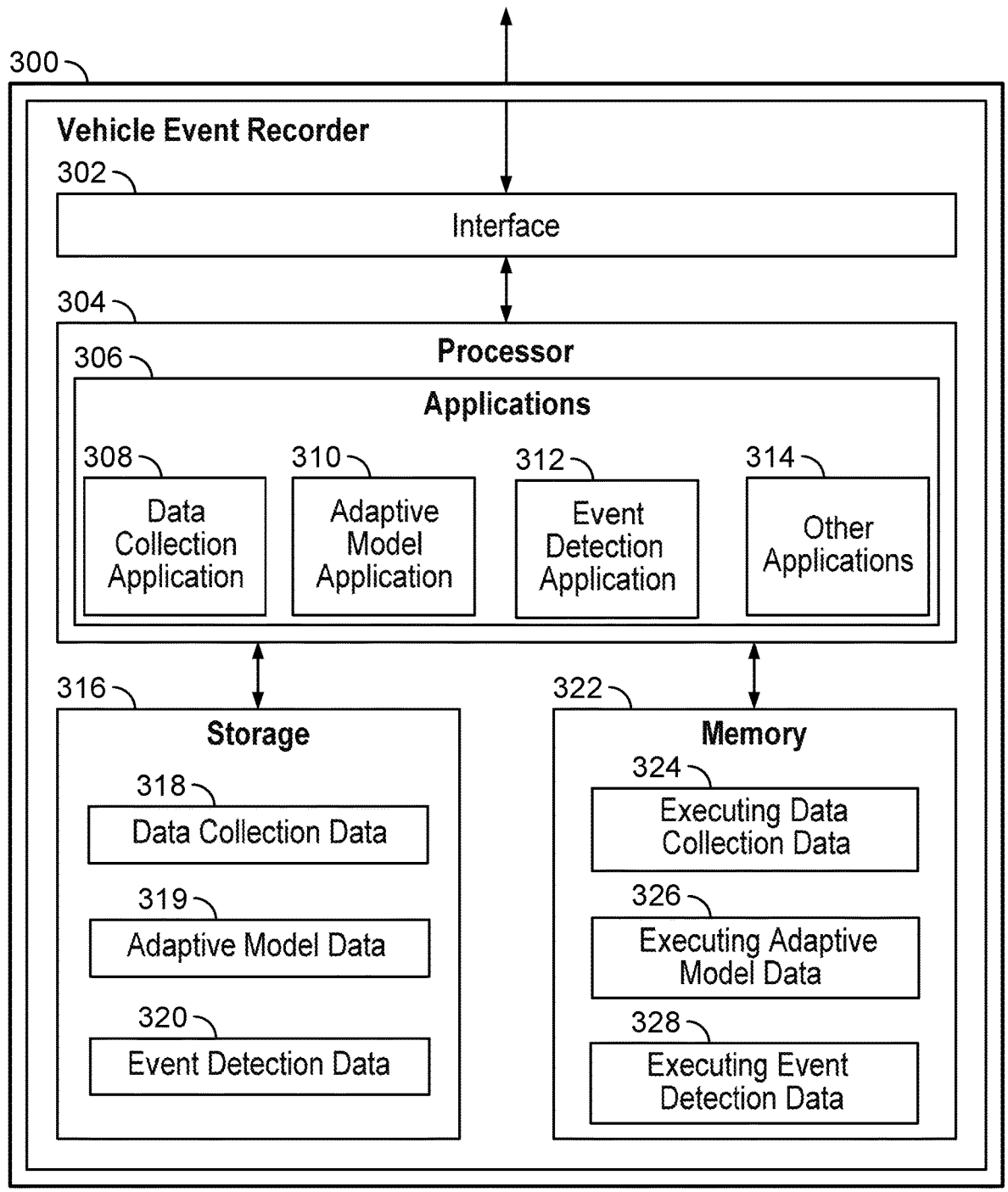
FIG. 3 is a block diagram illustrating an embodiment of a vehicle event recorder.

FIG. 3 is a block diagram illustrating an embodiment of a vehicle event recorder. In some embodiments, vehicle event recorder 300 of FIG. 3 comprises vehicle event recorder 102 of FIG. 1. In the example shown vehicle event recorder 300 comprises interface 302. Interface 302 is for communicating with external systems using a network. For example, interface 302 is for communicating with a vehicle data server, an administrator system, a user system, sensors, etc. Processor 304 comprises a processor for executing applications 306. Applications 306 comprise data collection application 308, adaptive model application 310, event detection application 312, and other applications 314. Data collection application 308 comprises an application for interacting with one or more sensor systems to receive and store data or with a vehicle data bus to receive and store data related to vehicle sensors. Data collection application 308 configures data collection. For example, data collection application 308 sets data collection parameters—for example, data sampling rate, data quality, sensor thresholds, etc.). Data collection application 308 processes received sensor data and stores data in storage 316 (e.g., in adaptive model data 318).

Adaptive model application 310 uses one or more models to process data received from vehicle or vehicle event recorder sensors (e.g., a camera sensor, an accelerometer, a global positioning sensor (GPS), etc.). For example, the one or more models is/are created for recognizing lanes in a city, for recognizing lanes on a highway, for recognizing following too close to another vehicle for a heavy truck, for recognizing following too close to another vehicle for a lighter van, for specialized processing related to one or more location types, weather condition types, vehicle types, traffic level types, speed level types, signage types, countries, states, or counties, or any other appropriate conditions for a model.

Event detection application 312 comprises an application for processing collected data to determine, store, mark, and provide events. In various embodiments, event detection application 312 uses data thresholding, data pattern matching, neural networks, machine learning, and/or any other appropriate method for determining events. In some embodiments, event detection application 312 utilizes operating point information for detecting events. For example, the operating point comprises trigger thresholds (e.g., trigger levels and/or trigger profiles, etc.), behavior types to review (e.g., cell phone usage, eating, drinking, and/or drowsy driving, etc.), behavior severity associated with a behavior type, custom events to review, etc. In some embodiments, event detection application 312 summarizes or analyzes event information including determining statistics and using the statistics for determining events to be transferred to a server (e.g., a fraction and/or a number of events to upload per type of event, etc.).

Other applications 314 comprises any other appropriate applications (e.g., a communications application, a chat application, a web browser application, a document preparation application, a data storage and retrieval application, a user interface application, a data analysis application, etc.).

Vehicle event recorder 300 additionally comprises storage 316. Storage 316 comprises data collection data 318, adaptive model data 319, and event detection data 320. Data collection data 318 comprises collected sensor data (e.g., sensor data collected by data collection application 308) as well as operating point data for configuring data collection, event detection, and/or event uploading. For example, operating point data comprises data parameters, trigger thresholds, behavior types to review, behavior severity associated with a behavior type, custom events to review, upload parameters, etc. Adaptive model data 319 comprises one or more stored models for execution on vehicle event recorder 300. In some embodiments, adaptive model data 319 includes training data for creating models in the event that models are created on vehicle event recorder 300. Event detection data 320 comprises stored event data for later transmission to a vehicle data server as well as stored parameters for event detection, models for event detection, etc.

Vehicle event recorder 300 additionally comprises memory 322 that includes executing data collection data 324, executing adaptive model data 326, executing event detection data 328. Executing data collection data 324 comprises data generated and used associated with data collection application 308 during execution. Executing adaptive model data 326 comprises data generated and used associated with adaptive model application 310 during execution. Executing event detection data 328 comprises data generated and used associated with event detection application 312 during execution.

Figure 4:
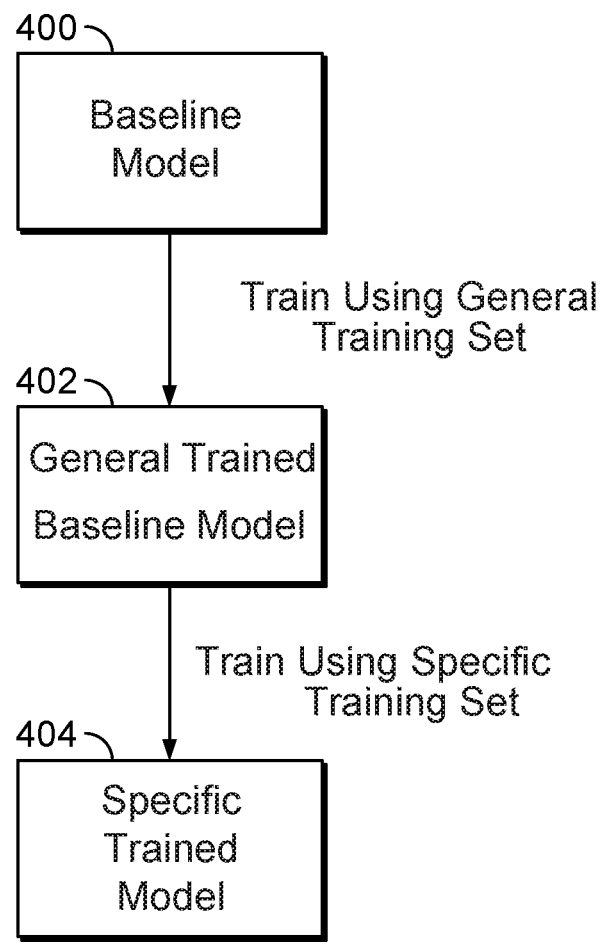
FIG. 4 is a diagram illustrating a process for training a model.
Figure 5:
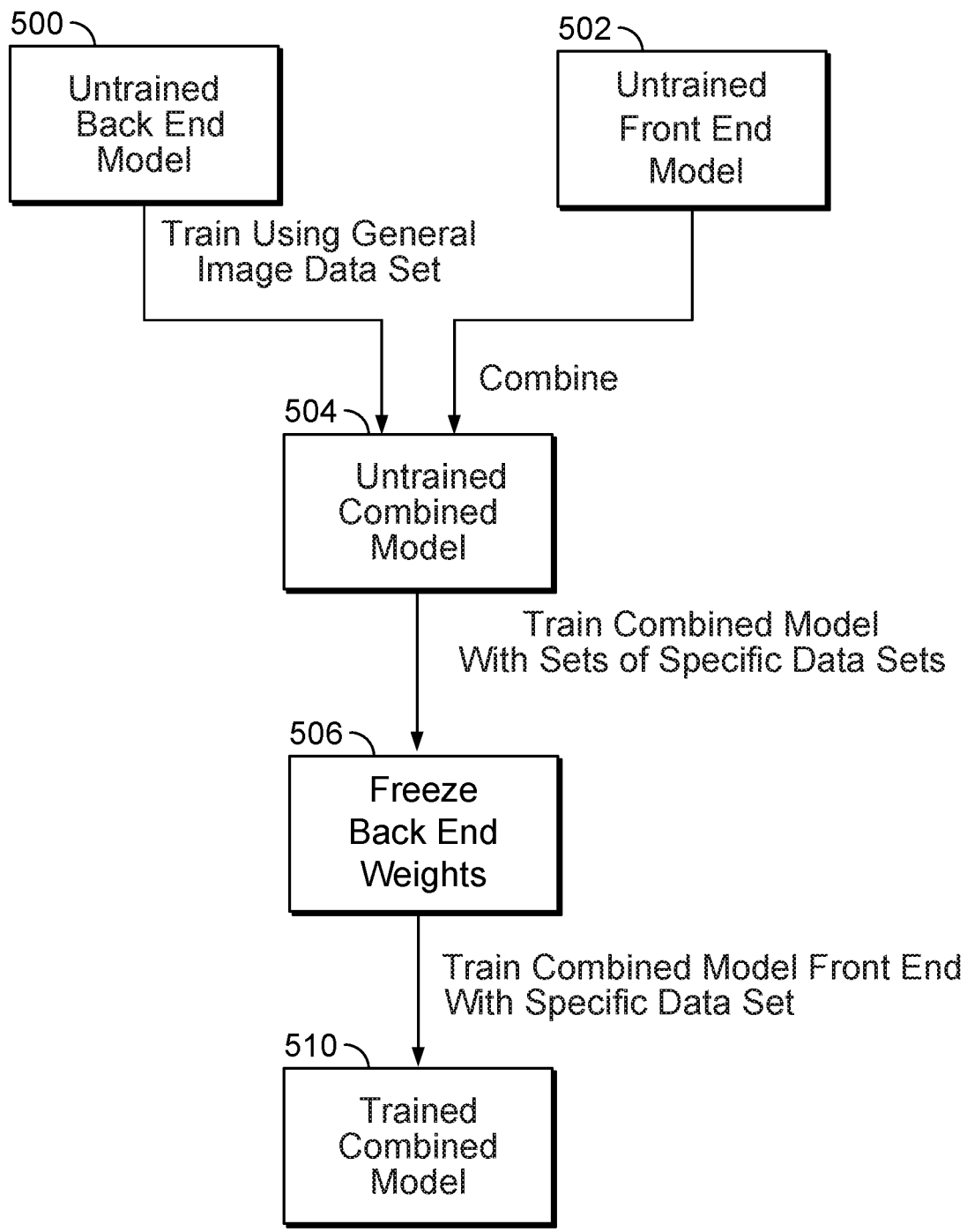
FIG. 5 is a diagram illustrating a process for training a model.

FIG. 4 is a diagram illustrating a process for training a model. In some embodiments, the process of FIG. 4 is implemented using processor 204 of FIG. 2. In the example shown, a baseline model of 400 is trained using a general training set. The general trained baseline model from 402 is trained using a specific training set to create a specific trained model of 404. In order to create specialized FIG. 5 is a diagram illustrating a process for training a model. In some embodiments, the process of FIG. 5 is implemented using processor 204 of FIG. 2. In the example shown, an untrained back end model in 500 is trained using a general training data set. For example, a general image data set is used to train a back end model. In some embodiments, the back end is trained for general recognition of image and/or video data. An untrained front end model in 502 is combined with the trained back end model from 500 to create an untrained combined model in 504. The untrained combined model in 504 is trained with sets of specific data sets. For example, the combined model is trained with complete library for a given recognition task (e.g., lane recognition in any scenario: city, highway, mountain, country, etc.). The back end weights are frozen in 506. For example, the general problem framework is frozen in the back end weights. The combined model front end is trained with a specific data set to create trained combined model 510. For example, trained combined model 510 comprises a specialized model to identify or recognize a specialized data set. In some embodiments, the general framework is able to help start the model with a good set of primitives, and starting with the overall training sets of the problem, but fine-tuned by training on a set of specific data for one scenario.

Figure 6:
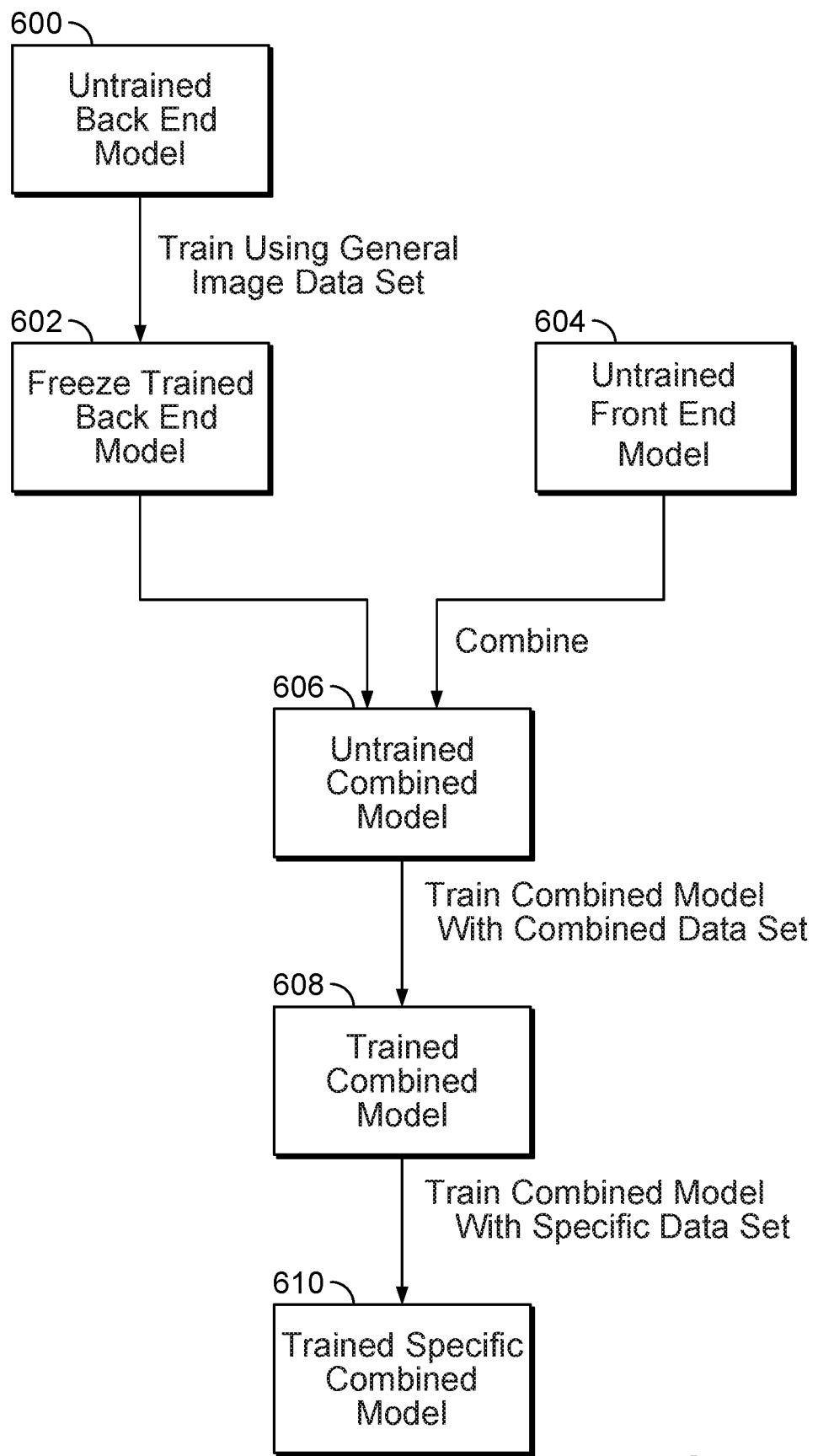
FIG. 6 is a diagram illustrating a process for training a model.

FIG. 6 is a diagram illustrating a process for training a model. In some embodiments, the process of FIG. 6 is implemented using processor 204 of FIG. 2. In the example shown, an untrained back end model of 600 is trained using a general image data set. In some embodiments, the back end is trained for general recognition of image and/or video data. The trained frozen back end model from 602 is combined with an untrained front end model of 604 to create an untrained combined model in 606. The untrained combined model from 606 is trained with a combined data set (e.g., a set of lane change data sets) to create a trained combined model of 608. For example, the combined model is trained with complete library for a given recognition task (e.g., lane recognition in any scenario: city, highway, mountain, country, etc.). The trained combined model from 608 is trained with a specific data set (e.g., a specific lane change data set). In some embodiments, the general framework is able to help start the model with a good set of primitives, and starting with the overall training sets of the problem, but fine-tuned by training on a set of specific data for one scenario.

In some embodiments, another possibility for training a model comprises training using a similar task. For example, a back end model is initialized by training on a general data set and the weights frozen and then the back end model is combined with a front end model and is trained for a similar task to a current task as an initial starting point for training the current task. The combined model is then finalized from a training point of view using current task training data. In various embodiments, the weights on the backend remain frozen and the weights from the front end are trained from the initialization point to be refined by training on the current task data, the weights on the backend are allowed to vary and the weights of the combined model are trained from the frozen and initialization point to be refined by training on the current task data, or any other appropriate training scheme. For example, a model for lane detection in city driving is trained using a model initially trained using a back end that was trained on a general training set and a combined model of that back end and a front end that was trained on a rural highway training set, The model for lane detection in city driving is then easier to train because the model is trained in a related, but different, scenario, and because of this the training is better and/or faster than training from an uninitialized or untrained front end model.

Figure 7:
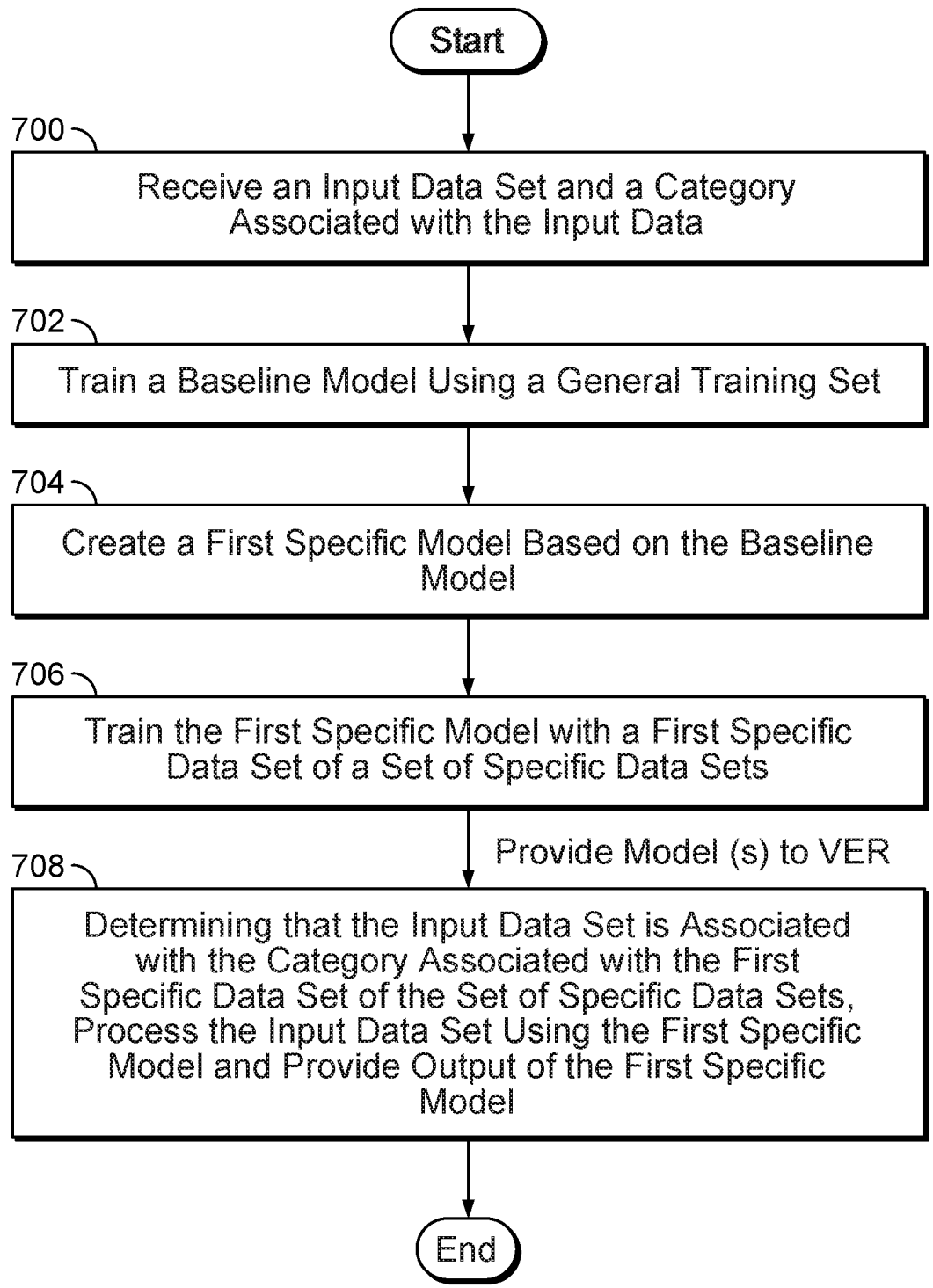
FIG. 7 is a flow diagram illustrating a process for training a model.

FIG. 7 is a flow diagram illustrating a process for training a model. In some embodiments, the process of FIG. 7 is implemented using processor 204 of FIG. 2. In the example shown, in 700 an input data set and a category associated with the input data are received. In 702, a baseline model is trained using a general training set. In 704, a first specific model is created based in the baseline model. In 706, the first specific model is trained with a first specific data set of a set of specific data sets. In 708, it is determined that the input data set is associated with the category associated with the first specific data set of the set of specific data sets, the input data set is processed using the first specific model, and the output of the first specific model is provided.

Figure 8:
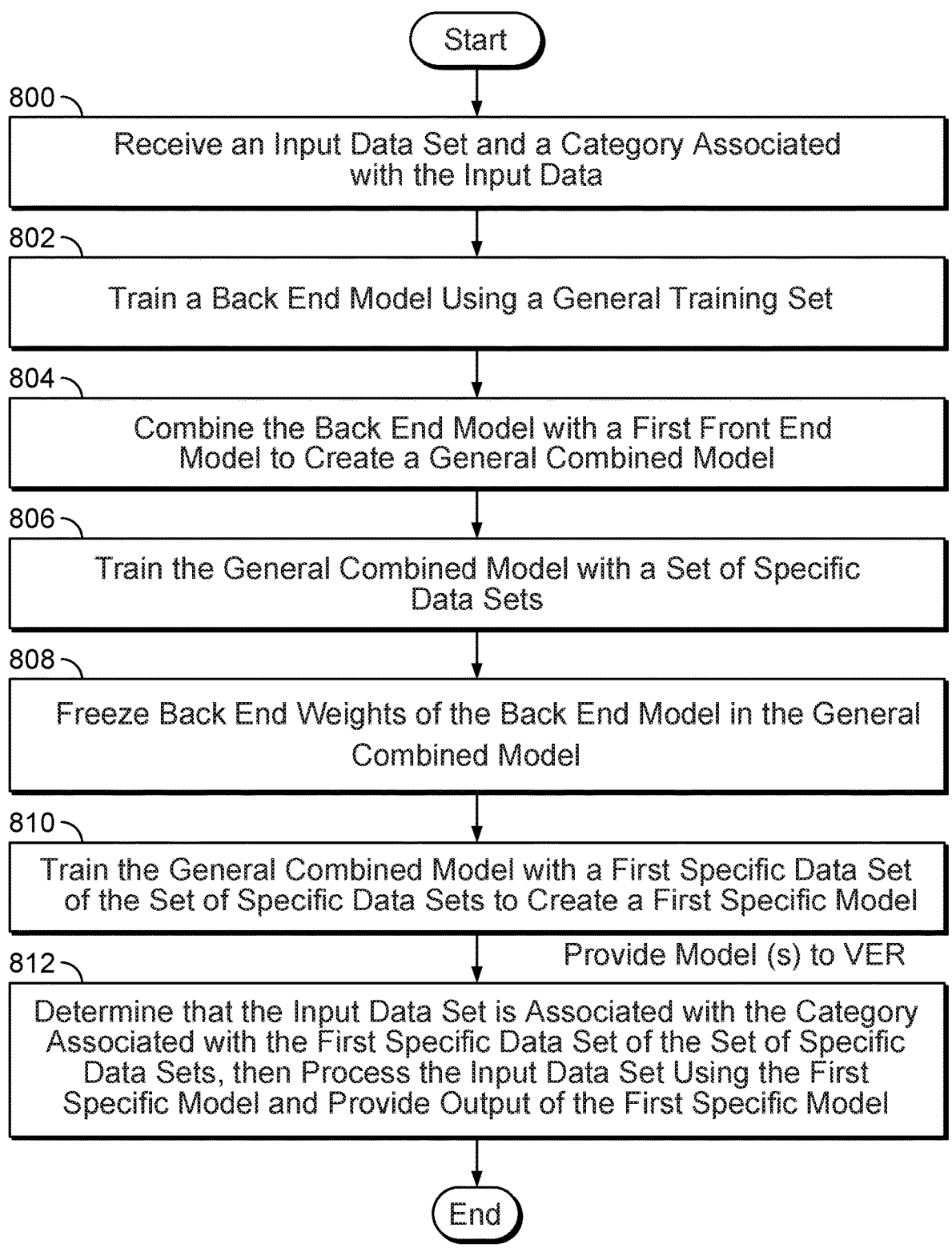
FIG. 8 is a flow diagram illustrating a process for training a model.

FIG. 8 is a flow diagram illustrating a process for training a model. In some embodiments, the process of FIG. 8 is implemented using processor 204 of FIG. 2. In the example shown, in 800 an input data set and a category associated with the input data are received. In 802, a back end model is trained using a general training set. In 804, the back end model is combined with a first front end model to create a general combined model. In 806, the general combined model is trained with a set of specific data sets. In 808, the back end weights of the back end model are frozen in the back end model of the general combined model. In 810, the general combined model is trained with a first specific data set of the specific data sets to create a first specific model. In 812, it is determined that the input data is associated with the category associated with the first specific data set of the set of specific data sets, then the input data set is processed using the first specific model and the output is provided of the first specific model.

Figure 9:
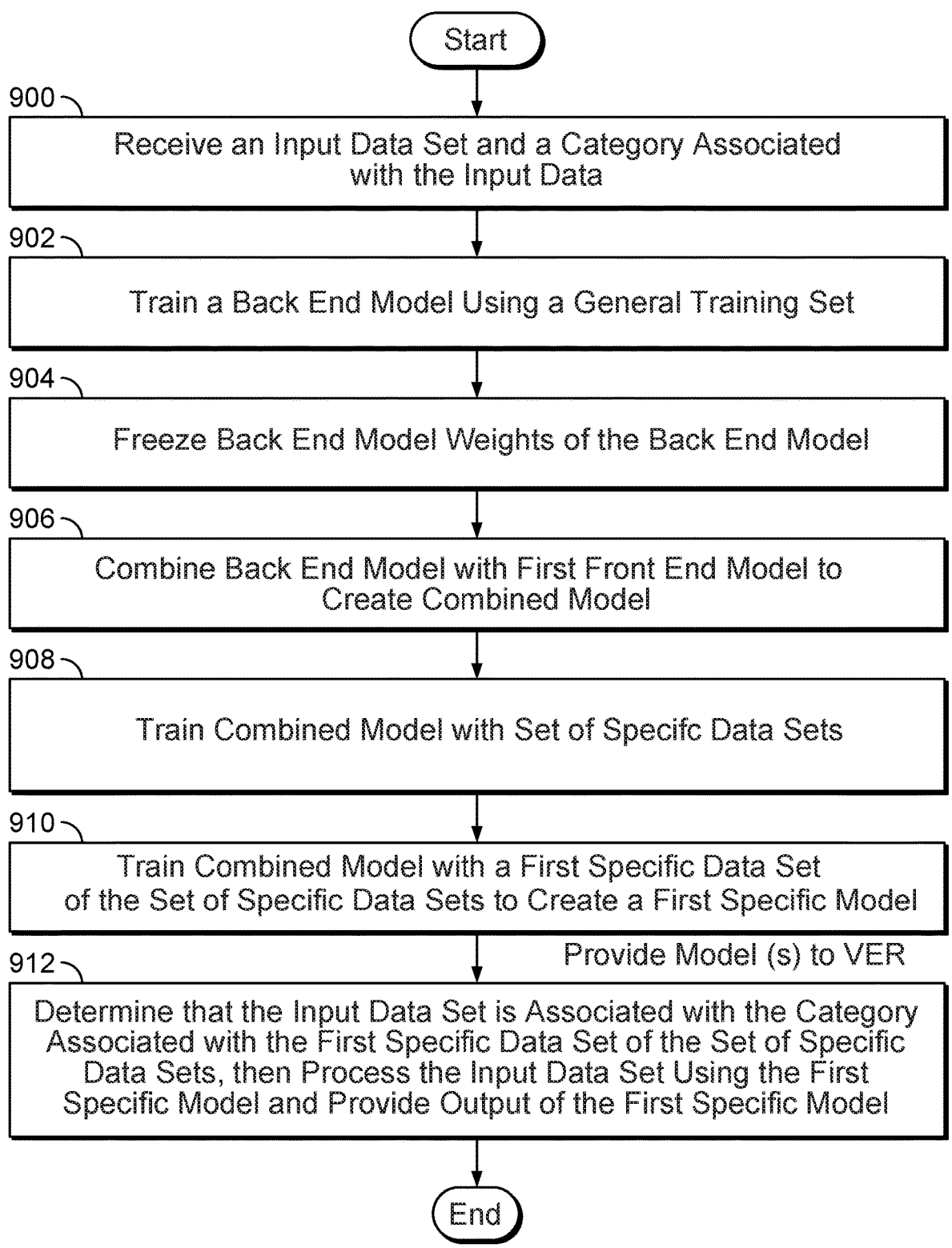
FIG. 9 is a flow diagram illustrating a process for training a model.

FIG. 9 is a flow diagram illustrating a process for training a model. In some embodiments, the process of FIG. 9 is implemented using processor 204 of FIG. 2. In the example shown, in 900, an input data set and a category associated with the input data are received. In 902, a back end model is trained using a general training set. In 904, the back end model weights are frozen on the back end model. In 906, the back end model is combined with a first front end model to create a general combined model. In 908, the combined model is trained with a set of specific data sets. In 910, the back end weights of the back end model are frozen in the back end model of the general combined model. In 810, the combined model is trained with a first specific data set of the specific data sets to create a first specific model. In 912, it is determined that the input data is associated with the category associated with the first specific data set of the set of specific data sets, then the input data set is processed using the first specific model and the output is provided of the first specific model.

Figure 10:
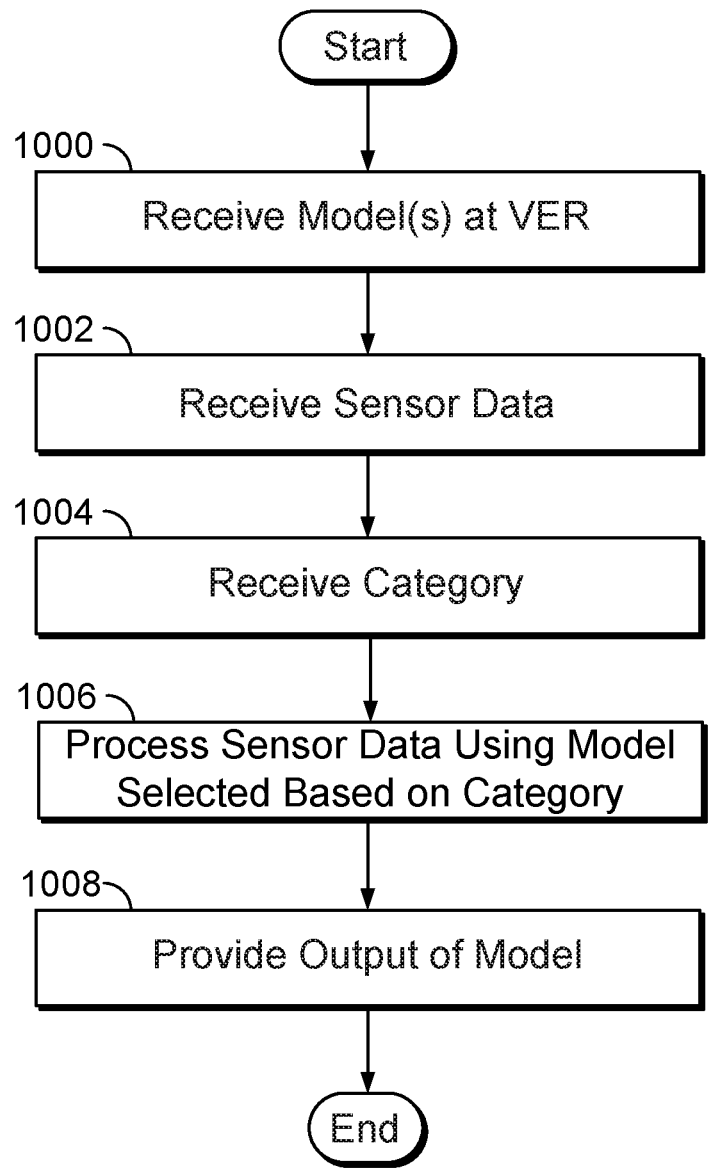
FIG. 10 is a flow diagram is a process for processing sensor data using a model.

FIG. 10 is a flow diagram is a process for processing sensor data using a model. In some embodiments, the process of FIG. 10 is implemented using processor 304 of FIG. 3. In the example shown, in 1000 model(s) is/are received at a vehicle event recorder (VER). For example, specialized models are received for types of data as received in the appropriate context. Models that are specialized for lane detection in a city, on a highway, on mountain roads, etc. In 1002, sensor data is received. For example, sensor data is received from an image device in a vehicle or a vehicle event recorder. In 1004, a category is received. For example, a city category is received. In 1006, sensor data is processed using a model selected based on the category. In 1008, the output of the model is provided. For example, the output of the model is provided to a data server or to a driver in a vehicle associated with the vehicle event recorder.

In some embodiments, a user determines which models of a set of specialized models are provided to a VER. For example, an administrator or a driver or a system user determines a subset of models to provide to a VER for data processing. In various embodiments, a selection is received from a user for whether the first specific model, the second specific model, the first specific model and the second specific model, neither the first specific model nor the second specific model are provided to a VER, or any other appropriate model or set of models are provided. In some embodiments, an administrator, a user, and/or a driver is enabled to select which model(s) is/are used for processing data at the VER, For example, sensor data catagories can be mapped to a preferred one or more models for processing on the VER by an administrator, a system user, and/or a driver.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
an interface configured to:
  receive a general training set and a set of specific data sets;
a processor configured to:
  train a back end model using the general training set, wherein the general training set comprises a general image training set;
  combine the back end model with a first front end model to create a general combined model;

train the general combined model with the set of specific data sets;

freeze back end weights of the back end model in the general combined model and combine the back end model with a first specific front end model to create a first specific model;

train the first specific model with a first specific data set of the set of specific data sets, wherein the set of specific data sets includes one or more specific data sets associated with a category, and wherein the category is defined by one or more of the following: a location, a weather condition, a vehicle type, a traffic level, a speed level, a signage type, a country name, a state name, or a county name; and provide the first specific model.

2. The system of claim 1, wherein the specific data sets comprise a city lane detection data set, a highway lane detection data set, and/or a mountain lane detection data set.

3. The system of claim 1, wherein the specific data sets comprise a rain weather following distance data set, a sunny weather following distance data set, a snow weather following distance data set, and/or a windy weather following distance data set.

4. The system of claim 1, wherein the specific data sets comprise a car vehicle type following distance data set, a trailer truck vehicle type following distance data set, a van vehicle type following distance data set, and/or a bus following distance data set.

5. The system of claim 1, wherein the specific data sets comprise a sparse traffic type following distance data set, a medium level traffic type following distance data set, and/or a dense traffic type following distance data set.

6. The system of claim 1, wherein the specific data sets comprise a car vehicle type driver face ID data set, a trailer truck vehicle type driver face ID data set, a van vehicle type driver face ID data set, and/or a bus driver face ID data set.

7. The system of claim 1, wherein the specific data sets comprise a specific country road sign data set, a specific city road sign data set and/or a specific region road sign data set.

8. The system of claim 1, wherein the specific data sets comprise a uniform wearing seat belt detection data set and/or a general clothing seat belt detection data set.

9. The system of claim 1, wherein the specific data sets comprise a near object detection data set and/or a far object detection data set.

10. The system of claim 1, wherein the first specific front end model is initialized to a final weight state of the first front end model within the general combined model after training.

11. The system of claim 1, wherein the first specific front end model is initialized to a generic starting state.

12. The system of claim 1, wherein the first specific model is one of a set of specific models where each specific model corresponds to a specific data set of the set of specific data sets.

13. The system of claim 1, wherein the processor is further configured to train a second specific model with a second specific data set of the set of specific data sets.

14. The system of claim 13, wherein the processor is further configured to provide the second specific model.

15. The system of claim 13, wherein the processor is further configured to receive a selection from a user for whether the first specific model, the second specific model, the first specific model and the second specific model, or neither the first specific model nor the second specific model are provided.

16. The system of claim 1, wherein the first specific model is used to process the input data set using the first specific model in response to determining that the input data set is associated with the category associated with the first specific data set.

17. A method, comprising:

receiving a general training set and a set of specific data sets;

training, using a processor, a back end model using a general training set, wherein the general training set comprises a general image training set;

combining the back end model with a first front end model to create a general combined model;

training the general combined model with a set of specific data sets;

freezing back end weights of the back end model in the general combined model and combine the back end model with a first specific front end model to create a first specific model;

training the first specific model with a first specific data set of the set of specific data sets, wherein the set of specific data sets includes one or more specific data sets associated with a category, and wherein the category is defined by one or more of the following: a location, a weather condition, a vehicle type, a traffic level, a speed level, a signage type, a country name, a state name, or a county name; and providing the first specific model.

18. A computer program product embodied in a non-transitory computer readable medium and comprising computer instructions for:

receiving a general training set and a set of specific data sets;

training, using a processor, a back end model using a general training set, wherein the general training set comprises a general image training set;

combining the back end model with a first front end model to create a general combined model;

training the general combined model with a set of specific data sets;

freezing back end weights of the back end model in the general combined model and combine the back end model with a first specific front end model to create a first specific model;

training the first specific model with a first specific data set of the set of specific data sets, wherein the set of specific data sets includes one or more specific data sets associated with a category, and wherein the category is defined by one or more of the following: a location, a weather condition, a vehicle type, a traffic level, a speed level, a signage type, a country name, a state name, or a county name; and providing the first specific model.

* * * * *